July 7, 1942.   L. P. CLARK, JR   2,289,102
AUTOMATIC MOLDING MACHINE
Filed June 3, 1938   2 Sheets-Sheet 1

INVENTOR.
LANCASTER P. CLARK, JR.
BY
ATTORNEY.

July 7, 1942.　　　L. P. CLARK, JR　　　2,289,102
AUTOMATIC MOLDING MACHINE
Filed June 3, 1938　　　2 Sheets-Sheet 2
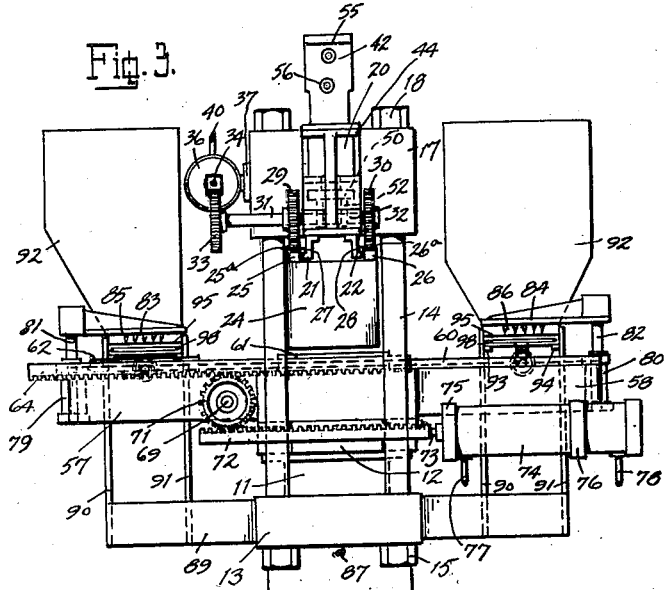
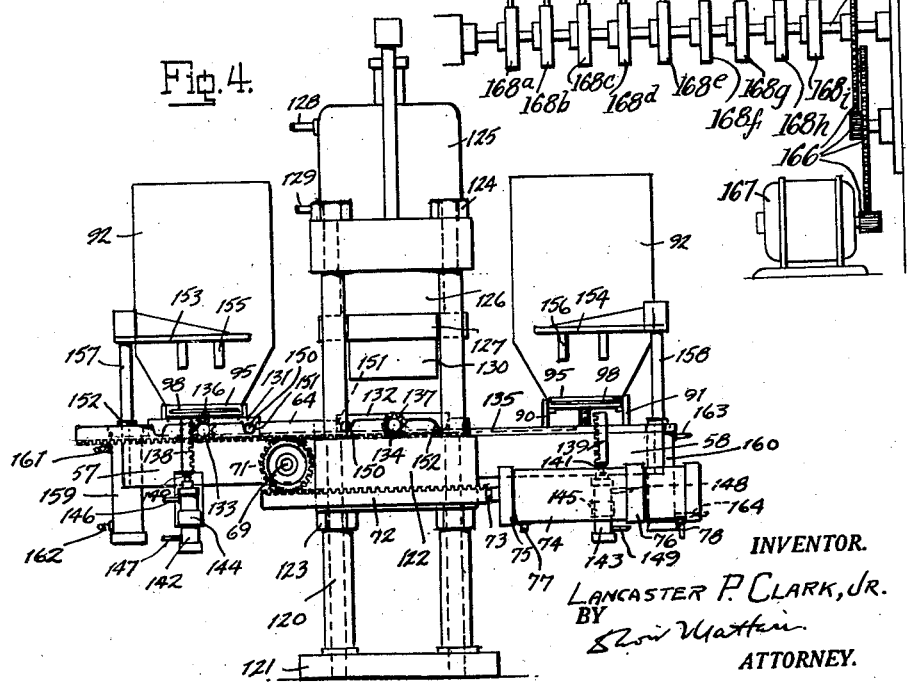
INVENTOR.
LANCASTER P. CLARK, JR.
BY
ATTORNEY.

Patented July 7, 1942

2,289,102

UNITED STATES PATENT OFFICE 2,289,102

AUTOMATIC MOLDING MACHINE

Lancaster P. Clark, Jr., Fairfield, Conn.

Application June 3, 1938, Serial No. 211,478

5 Claims. (Cl. 18—16)

The present invention relates to an automatic molding machine, particularly for the automatic molding of plastic material which as a part of the molding process is subject to heat to render the raw material plastic, pressure, gassing, and curing. Upon completion of each molding cycle the product is ejected from the mold, the mold cleaned, and then reloaded with raw material.

It is an object of the present invention to provide a molding machine having duplex sets of molding dies, one set of which is adapted to be subjected to the operations such as ejecting, cleaning and reloading which occur outside of the press, while the other set is in the press undergoing the operations, such as heating, compressing, gassing and curing, which take place in the press. A further object is to provide such a machine in which the various operations are synchronized and may be accurately controlled for the purpose of properly molding plastic material under various conditions, it being understood that different materials require different heating temperatures and curing times, and also that these factors vary to a large extent according to the size and thickness of the piece being molded.

A further object is to provide such automatic equipment which may be attached to a semi-automatic single die molding press of known type. A further object is to provide such automatic equipment which is readily adapted to different types of dies, and in this respect it is proposed to provide such equipment which can with slight modification be incorporated either in the ordinary type of single die press with lower movable platen to produce a machine of the type in which the molded article is ejected from the top die of the mold, or in the type having the upper platen movable and in which the molded article is ejected from the bottom die.

With the above and other objects in view, embodiments of the invention are shown in the accompanying drawings, and these embodiments will be hereinafter more fully described with reference thereto, and the invention will be finally pointed out in the claims.

In the drawings:

Fig. 3 is a side elevation.

Fig. 4 is a side elevation of a modified form of the invention incorporated in an upper movable platen type of press, in which the molded articles are adapted to be ejected from the bottom.

Fig. 5 is a side elevation of an automatic control mechanism for synchronous automatic operation of the machine according to the invention.

Similar reference characters indicate corresponding parts throughout the several figures of the drawings.

Figure 1:
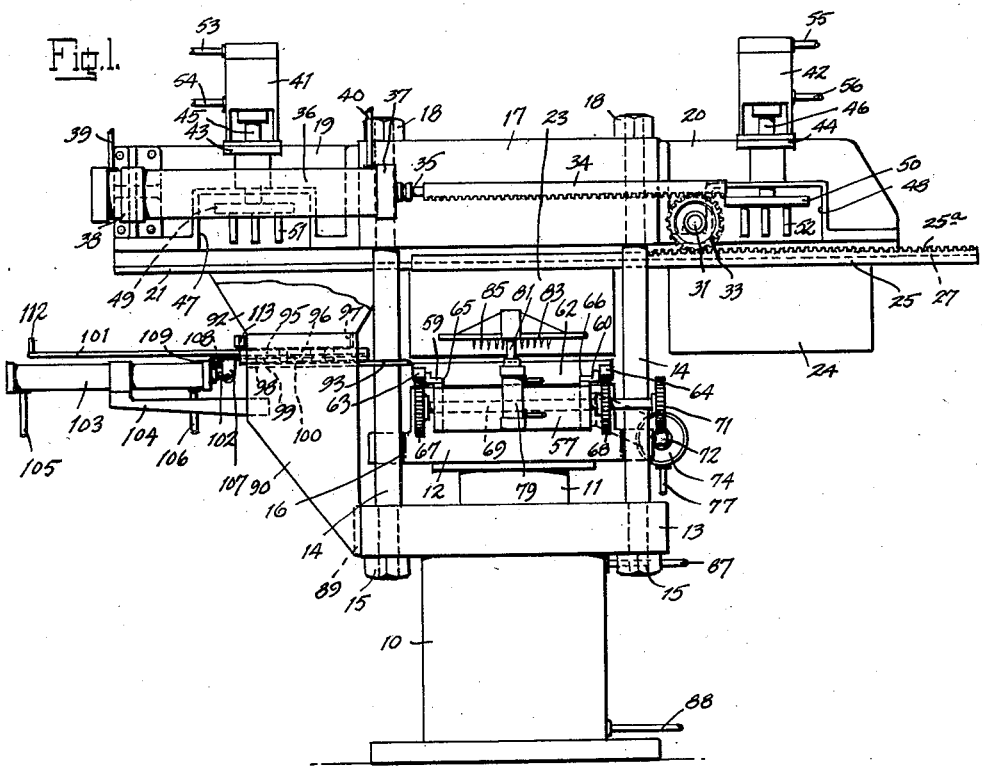
Fig. 1 is a front elevation of an automatic molding machine according to the invention, and of the lower movable platen type, in which the molded articles are adapted to be ejected from the top side.
Figure 2:
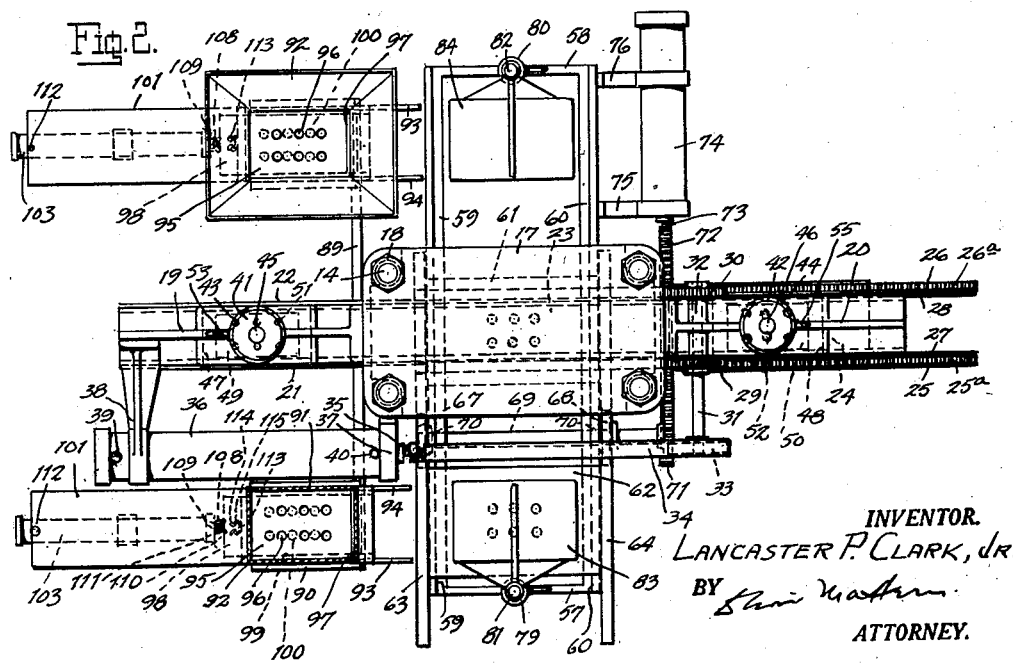
Fig. 2 is a plan view thereof.

Referring to the drawings and particularly to Figs. 1 to 3 thereof, the molding lower movable platen type of press disclosed therein is of the well known post type consisting of a base 10, containing the hydraulic ram 11 carrying the lower platen 12, the base being provided at its upper end with a projecting flange 13 in which the lower ends of the four corner posts 14 are secured by nuts 15, the platen 12 being cut-out at its corners as at 16 to have sliding engagement with the posts. Upon the upper ends of the posts there is mounted the upper fixed platen or head 17 secured by nuts 18, to which the upper die of the mold is secured.

In the normal use of a press of this type for semi-automatic molding the upper die is secured at the under side of the upper platen or head 17 and the lower die is secured to the vertically movable platen 12, the molded articles being ejected from the upper die after the molding operation and with the press open, and the lower die being loaded with raw material by means of a loading board which is normally engaged with the lower die.

According to one embodiment of the present invention a pair of upper dies are provided which are adapted to be automatically moved from side to side and into and out of the press, one die being in the press while the other die is moved to the right, and this latter die being in the press while the first die is moved to the left, the molded articles being ejected from the die which is out of the press while the other die is in the press. Upon the lower platen there are provided two lower dies adapted to be moved into and out of the press from front to back, one die being in the press while the other is out of the press where it is loaded with raw material.

Upon the respective sides of the head 17 there are secured ejector brackets 19 and 20, the lower surfaces of these brackets constituting a continuation of the lower surfaces of the head 17 and upon which continuous lower surfaces there are secured flanged guide rails 21 and 22. The two upper dies 23 and 24 are rigidly secured together by means of rack bars 25 and 26 at each side, these rack bars being provided along a portion of their upper surfaces with rack teeth 25ᵃ and 26ᵃ respectively, and being provided at their inner surfaces with inwardly extending flanges 27 and 28 respectively, which engage the rails 21 and 22 to thus slidably support the two dies so that they may be moved into and out of the press and into and out of relation with the respective ejector brackets 19 and 20.

This movement is imparted to the dies by means of gears 29 and 30 mounted upon a shaft 31 journaled in a bearing portion 32 provided in the ejector bracket 20, this shaft being provided at its outer end with a gear 33 which meshes with a rack 34 secured to the end of the piston rod 35 of the hydraulic cylinder 36, which is supported at one end by a bracket 37 secured to the forward side of the head 17 and at its other end by means of a bracket 38 secured to the ejector bracket 19. This cylinder 36 has connected to it the hydraulic tubes 39 and 40 which are adapted to operate the piston rod in opposite directions, and which extend to a suitable automatic control device designed to synchronize the action of this cylinder with the other hydraulic cylinder actuated parts of the machine, it being understood that the other hydraulic cylinders, hereinafter described, are similarly connected to such automatic control device. Such control devices usually consist of a motor operated shaft upon which there is provided a series of cams, each cam being designed for the particular cylinder and being adjustable to accurately control the operation of such cylinder, these cams controlling the valving of the respective cylinders. Such devices are the well known Bristol and Summit time cycle control systems. In Fig. 5 I have illustrated diagrammatically the essential parts of such automatic control device and which consists of a shaft 165 rotated through reduction gearing 166 from an electric motor 167, this shaft having mounted thereon a series of nine cams 168ᵃ, 168ᵇ, 168ᶜ, 168ᵈ, 168ᵉ, 168ᶠ, 168ᵍ, 168ʰ and 168ⁱ, which respectively operate valves 169ᵃ, 169ᵇ, 169ᶜ, 169ᵈ, 169ᵉ, 169ᶠ, 169ᵍ, 169ʰ and 169ⁱ. These valves control the valving of the hydraulic fluid to the respective hydraulic cylinders for controlling the synchronous operation of the various parts of the machine, the valve 169ᵃ being connected by the tubes 87 and 88 to the hydraulic ram 10 of the movable platen, the valve 169ᵇ being connected by the tubes 53 and 54 to the ejector cylinder 41, the valve 169ᶜ being connected by the tubes 55 and 56 to the ejector cylinder 42, the valve 169ᵈ being connected by the tubes 39 and 40 to the cylinder 46 for operating the upper mold part carrier, the valve 169ᵉ being connected by the tubes 77 and 78 to the cylinder 44 for controlling the lower mold part carrier, the valve 169ᶠ being connected to the tubes of the cylinder 79 for operating the feeler plate 83, the valve 169ᵍ being connected to the tubes of the cylinder 80 for operating the feeler plate 84, the valve 169ʰ being connected by the tubes 105 and 106 to the operating cylinder 103 of the forwardly disposed loading board 101, and the valve 169ⁱ being connected by the tubes 105 and 106 of the cylinder 103 of the rearward loading board 101.

Upon the respective ejector brackets 19 and 20 there are provided vertically disposed hydraulic cylinders 41 and 42 mounted upon bearing portions 43 and 44 formed upon the brackets and in which operate vertically movable piston rods 45 and 46, the lower ends of these rods being disposed respectively in upwardly recessed pocket portions 47 and 48 of the brackets and having secured thereon within these pocket portions ejector plates 49 and 50 carrying ejector pins 51 and 52, which correspond to the number of articles being molded, and are adapted to enter the upper dies 23 and 24 and cooperate with the ejector means forming part of the molds. The cylinder 41 is provided with hydraulic tubes 53 and 54 and the cylinder 42 is provided with hydraulic tubes 55 and 56, these being connected to the synchronizing control mechanism above referred to.

It will be understood that when the mold 23 is in the press and the mold 24 is moved to the right as shown in Fig. 1 the ejector plate 50 will be moved downwardly to eject the articles from the mold, these articles dropping into a suitable receptacle. In the other position with the mold 24 in the press and the mold 23 moved to the right the ejector plate 49 is operated to remove the articles from the mold 23.

Upon the forward and rearward sides of the vertically movable platen 12, there are respectively secured U-shaped frames 57 and 58, the upper surfaces of the sides of these frames being continuous with the upper surface of the platen and there being flanged guide tracks 59 and 60 secured upon these continuous upper surfaces, these tracks extending continuously from the outer end of the bracket 57 to the outer end of the bracket 58. The two lower mold members 61 and 62 are secured together in spaced relation by rack bars 63 and 64 secured at each of their sides, these rack bars being provided along a portion of their under surface with rack teeth 63ᵃ and 64ᵃ respectively. The molds are provided at their under sides and adjacent their side edges with angular channels 65 and 66 which are engaged by the guide tracks 59 and 60, so that the two molds are slidably supported and can be moved into and out of the press from the front to the rear, it being understood that when the mold 62 is in the press the mold 61 is moved rearwardly upon the bracket 58.

This movement is imparted to the racks and molds by means of gears 67 and 68 mounted upon a shaft 69 journaled in a bearing portion 70 provided in the bracket 57, a gear 71 being secured upon the end of this shaft which meshes with a rack 72 secured to the piston rod 73 of a hydraulic cylinder 74, this cylinder being supported upon the bracket 58 by means of bracket supports 75 and 76. Hydraulic tubes 77 and 78 are connected to the cylinder 74 and extend to the synchronizing control device above referred to. Upon the respective ends of the brackets 57 and 58 there are provided vertically disposed hydraulic cylinders 79 and 80 in which piston rods 81 and 82 operate, these piston rods having mounted upon their upper ends feeler plates 83 and 84 carrying a series of feeler fingers 85 and 86. These feeler fingers are designed for the purpose of insuring against any material remaining in the molds after they move out of the press, so that the molds will be absolutely clean before being reloaded. These fingers are designed for the particular mold shapes and upon entering the mold through vertical movement of the piston will remain stationary with respect to the plate if there is no obstruction in the mold such as a piece of the molded material. If there is an obstruction the fingers are designed to become displaced, which displacement closes an electric circuit to produce a signal, and automatically stop the machine, and which signal will cause the attendant of the machine to remove the piece of material remaining in the mold and then restart the machine.

This feeler operation takes place as soon as the mold is moved out of the press, the feeler head moving downwardly into engagement with the mold and then moving upwardly, so as to provide a space between the upper surface of the mold and the feeler plate into which space the loading board moves automatically as will presently more fully appear, this loading board being disposed at a fixed level which corresponds to the level of the lower mold when the lower mold in the press is in the raised or closed position, and during which period the plastic material is undergoing the curing process.

It will be seen that the feeler mechanism as well as the feeding mechanism for the lower molds, including the hydraulic cylinder 74, are all carried by the lower movable platen 12.

Prior to the loading operation the press is gassed, that is, at a predetermined time after the dies are first closed the dies are opened slightly to permit the escape of the gas that forms therein because of the action of the heated mold on the material, the dies then being closed again after this gassing operation and remaining closed for the relatively long curing period, this curing period varying with different materials and with different sizes and thicknesses of articles and being as much as 3 to 5 minutes in some cases. During this curing period the loading mechanism comes into operation. The hydraulic ram 11 has connected to it the hydraulic tubes 87 and 88 which are connected to the synchronizing control device above referred to to control the movements of the lower platen at the proper times in the cycle with the movements of the other parts of the machine.

The two loading mechanisms are supported upon the ends of a beam 89 secured to the left hand side of the flange 13 of the base 10, these mechanisms being disposed in line with the lower molds 61 and 62 in the respective rearwardly and forwardly moved positions. Inasmuch as these two mechanisms are of identical construction, only one will be described in detail and the same reference characters will be applied to each mechanism. Each loading mechanism consists of a pair of spaced vertically disposed supporting bracket members 90 and 91 mounted at their lower ends upon one end of the beam 89 and supporting at their upper ends the lower contracted end of the material feeding hopper 92. In spaced relation below the end of the hopper there are secured upon the inner walls of the brackets 90 and 91 guide rails 93 and 94 projecting to the right to a point adjacent the left hand edge of the lower mold and having their upper surfaces flush with the upper surface of the mold. Upon these rails there is supported the loading board 95, the relation of the guides to the lower die being such that the board will be moved from the guides on the die.

The board is provided with a series of pockets 96 which correspond in position to the cavities of the mold and are of such size as to receive the required measured quantity of material for each article, this material being either in the form of powder or in the form of a pre-formed pellet. The upper surface of the board is flush with the under side of the hopper so that as the board moves into place beneath the hopper the pockets 96 become filled with the material there being provided a suitable scraper 97 within the hopper which engages the upper surface of the board as it moves from beneath the hopper so as to remove the excess material upon the upper surface of the board.

The pockets 96 are in the form of holes which extend entirely through the board and the material is supported during filling of the board and transmission from the hopper to the mold by means of trip slide 98 movable in a slideway 99 in the board and provided with a series of holes 100 which are normally out of register with the holes 96 so that the slide closes the bottom of the holes 96 to thus support the material in the holes. Upon relative movement of the trip slide the holes 100 register with the holes 96, so that the material in the pockets may drop through, it being understood that this operation occurs when the board is in aligned relation with the mold and the holes of the board and in register with the cavities of the mold.

The loading board is provided with an extension board 101 which moves beneath the hopper as the board moves into aligned relation with the die so that the hopper is closed during this operation.

Movement is imparted to the loading board by means of a piston rod 102 operating in a cylinder 103 supported upon a bracket 104 mounted upon the brackets 90 and 91, this cylinder having hydraulic tubes 105 and 106 connected to it which are connected to the synchronizing control device above referred to. The piston rod 102 is connected to an arm 107 depending from and secured to the outer end of the trip slide 98. The slide is releasably connected to the loading board by means of a pin 108 provided upon the end of the slide which engages a spring clip 109 secured upon the under side of the loading board, this spring clip having a flared entrance portion 110 and retaining shoulders 111, so designed that the retaining force of the clip is greater than the force required to engage the pin with the clip.

The extension 101 is provided at its end with a pin 112 which is adapted to engage a clip 113 secured upon the wall of the hopper and which is of similar design to the clip 109, being provided with a flared entrance portion 114 and retaining shoulders 115. As seen in Fig. 1 the pin 108 is engaged with the clip 109 so that as the piston rod 102 moves to the right the trip slide carries the loading board with it into position above the lower die. At the point where the holes 96 of the loading board register with the cavities of the mold the pin 112 of the extension 101 has engaged the spring clip 113, and further movement of the loading board to the right is prevented through abutment of the pin 112 with the inner end of the clip 113. However, the trip slide continues to move to the right through continued movement of the piston rod 102, which continued movement releases the pin 108 from the clip 109, this movement being predetermined so that the holes 100 of the trip slide come into register with the holes 96 of the loading board, thus releasing the material in the loading board which drops into the mold cavities. Upon the return movement of the piston rod the loading board remains fixed through the retaining engagement of the pin 112 with the clip 113 until the pin 108 engages the clip 109, the fact that the engaging force of the pin with the clip is less than the retaining force of the clip 113 upon the pin 112 allowing this engagement before release of the pin 112 from the clip 113. The openings 96 are thus closed by the trip slide before the loading board starts its return movement, this return movement of the loading board occurring as soon as the pin 108 is engaged with the clip 109, this continued movement of the trip slide and board to the left releasing the pin 112 from the clip 113 so that the board returns to the loading position as shown in Fig. 1. In the case of using preformed pellets a suitable magazine feeding mechanism is incorporated in the loading part of the machine.

In Fig. 4 I have illustrated a modification of the invention in which the automatic loading and ejecting mechanism is incorporated in a press of the inverted ram type and in which the articles are ejected from the lower mold. This press is substantially like the press illustrated in Figs. 1 to 3, except that the ram is inverted, and comprises four posts 120 mounted upon a base 121 and having the fixed lower platen 122 secured thereon by means of a nut 123. Upon the upper ends of the posts there is secured by means of nuts 124 a hydraulic cylinder head 125, in which the hydraulic ram 126 supporting the upper movable platen 127 operates. The cylinder 125 is provided with hydraulic tubes 128 and 129 which are connected to the synchronizing control device. This is similar to that referred to above in connection with the first embodiment.

In the present modification only one upper mold is required, this mold 130 being secured upon the upper movable platen 127. Two lower molds are provided which are substantially similar in arrangement to the molds of the first embodiment, these molds 131 and 132 being adapted to move from the front to the rear into and out of relation with the supporting brackets 57 and 58 secured upon the front and rear surfaces of the fixed platen 122. The molds 131 and 132 instead of being rigidly secured to the racks 63 and 64, as in the first embodiment, are pivotally supported upon trunnions 133 and 134 respectively, which trunnions extend through suitable bearing apertures in the racks.

The racks and molds are adapted to slide upon guide rails 135 which are mounted in a similar manner to the rails 59 and 60 of the first embodiment, but which terminate short of the central axis of the dies in the outwardly moved positions, so that they may be rotated into inverted relation for the purpose of ejecting the molded articles therefrom, as will presently more fully appear. Sliding movement is imparted to the racks and molds by the same mechanism as employed in the first embodiment, namely, the gear 71 and the rack 72 operated by the piston rod 73 of the hydraulic cylinder 74.

Upon one end of each of the trunnions 133 and 134 there are respectively provided pinion gears 136 and 137 which are adapted in the outwardly moved position of the respective molds to move into relation with vertically disposed racks 138 and 139 carried by the piston rods 140 and 141 of hydraulic cylinders 142 and 143 supported upon the brackets 57 and 58 by means of bracket supports 144 and 145. The cylinder 142 is provided with hydraulic tubes 146 and 147 and the cylinder 143 is provided with hydraulic tubes 148 and 149, these tubes being connected to the synchronizing control device, above referred to. As each die moves to its outward position and its pinion meshes with the vertical rack vertical movement is imparted to the rack to cause the die to be turned into inverted position, and in this position the articles are ejected. In the normal position of each die a pin 150 provided on one side thereof engages a recess 151 in the rack 64 at one side of the trunnion, while in the inverted position this pin engages a recess 152 in the rack at the other side of the trunnion.

Instead of the feeler plates, as employed in the first embodiment, there are provided ejector plates 153 and 154 which are disposed in substantially the same relation to the dies as the feeler plates, these ejector plates having ejector pins 155 and 156 mounted therein, and being supported upon piston rods 157 and 158 movable in piston cylinders 159 and 160 carried upon the brackets 57 and 58. Hydraulic tubes 161 and 162 are connected to the cylinder 159 and hydraulic tubes 163 and 164 are connected to the cylinder 160, these being connected to the synchronizing control device above referred to.

From the above description it will be obvious that the principles of the invention may be incorporated in other types of molding machines as for instance a press having both upper and lower platens movable.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:

1. In a molding machine, a press comprising upper and lower platens each having four sides and means for moving one of said platens toward the other, mold guide means disposed in cooperatively aligned relation to one of said platens and projecting in opposite directions from two opposed sides thereof, a pair of spaced mold parts connected in tandem and movable on said guide means adapted to be successively disposed in and out of aligned relation with the aligned platens in the press by movement of said pair of mold parts in opposite directions whereby one of said mold parts is in alignment with the aligned platens in the press while the other mold part is supported upon said guide means at one side or the other of the press, a second mold guide means disposed in cooperatively aligned relation to said other platen and projecting in opposite directions from two opposed sides thereof and at right angles to the first mentioned guide means, and a pair of spaced mold parts connected in tandem and movable on said second guide means adapted to be successively disposed in and out of aligned relation with the aligned platens in the press by movement of said second pair of mold parts in opposite directions whereby one of said second pair of mold parts is in alignment with the aligned platens in the press while the other of said second pair of mold parts is supported upon said second guide means at one side or the other of the press.

2. In a molding machine, a press comprising upper and lower platens each having four sides and means for moving one of said platens toward the other, mold guide means disposed in cooperatively aligned relation to one of said platens and projecting in opposite directions from two opposed sides thereof, a pair of spaced mold parts connected in tandem and movable on said guide means adapted to be successively disposed in and out of aligned relation with the aligned platens in the press by movement of said pair of mold parts in opposite directions whereby one of said mold parts is in alignment with the aligned platens in the press while the other mold part is supported upon said guide means at one side or the other of the press, a second mold guide means disposed in cooperatively aligned relation to said other platen and projecting in opposite directions from two opposed sides thereof and at right angles to the first mentioned guide means, and a pair of spaced mold parts connected in tandem and movable on said second guide means adapted to be successively disposed in and out of aligned relation with the aligned platens in the press by movement of said second pair of mold parts in opposite directions whereby one of said second pair of mold parts is in alignment with the aligned platens in the press while the other of said second pair of mold parts is supported upon said second guide means at one side or the other of the press, and means carried by said movable platen to impart reciprocating movement to said mold parts disposed in relation thereto.

3. In a molding machine, a press comprising a pair of opposed platens, and means for moving one of said platens toward and away from the other, a mold part carried by one of said platens, mold guide means rigidly connected to the other of said platens disposed at right angles to the direction of movement of said movable platen comprising an intermediate portion extending across said other platen and end portions projecting in opposite directions from the opposed sides thereof, a pair of longitudinally spaced mold parts carried by and movable on said mold guide means, reciprocating mold part propelling means arranged parallel to said mold guide means for reciprocatory movement at right angles to the direction of movement of said movable platen and connected between said spaced mold parts, whereby said mold parts are adapted to be successively disposed in and out of aligned relation with said opposed platens by the reciprocatory movement of said propelling means, one of said pair of mold parts being in alignment with the opposed platens in the press and with said first mentioned mold part while the other of said pair of mold parts is out of the press in predetermined spaced relation to and in the same plane with said mold part in the press, relative closing and separating movement between said platens adapted to respectively close and separate said aligned mold parts.

4. In a molding machine, a press comprising a pair of opposed platens, and means for moving one of said platens toward and away from the other, a mold part carried by said other platen, mold guide means rigidly connected to said movable platen disposed at right angles to the direction of movement of said movable platen comprising an intermediate portion extending across said movable platen and end portions projecting in opposite directions from the opposed sides thereof, a pair of longitudinally spaced mold parts carried by and movable on said mold guide means, reciprocating mold part propelling means arranged parallel to said mold guide means for reciprocatory movement at right angles to the direction of movement of said movable platen and connected between said spaced mold parts, whereby said mold parts are adapted to be successively disposed in and out of aligned relation with said opposed platens by the reciprocatory movement of said propelling means, one of said pair of mold parts being in alignment with the opposed platens in the press and with said first mentioned mold part while the other of said pair of mold parts is out of the press in predetermined spaced relation to and in the same plane with said mold part in the press, relative closing and separating movement between said platens adapted to respectively close and separate said aligned mold parts.

5. In a molding machine, a press comprising a pair of opposed platens each having four sides, and means for moving one of said platens toward and away from the other, mold guide means rigidly connected to one of said platens disposed at right angles to the direction of movement of said movable platen comprising an intermediate portion extending across said platen and end portions projecting in opposite directions from two opposed sides thereof, a pair of longitudinally spaced mold parts carried by and movable on said guide means, reciprocating mold part propelling means arranged parallel to said mold guide means for movement at right angles to the direction of movement of said movable platen, and connected between said spaced mold parts whereby said mold parts are adapted to be successively disposed in and out of aligned relation with said opposed platens by the reciprocating movement of said propelling means, one of said mold parts being in alignment with the aligned platens in the press while the other mold part is supported upon said guide means at one side or the other of the press in predetermined spaced relation to and in the same plane with said mold part in the press, a second mold guide means rigidly connected to said other platen and projecting therefrom in a plane parallel to and spaced from the plane of said first mentioned guide means, and a mold part movable on said second guide means adapted to be successively disposed in and out of aligned relation with the aligned platens in the press by movement of said mold part in opposite directions whereby in one position said mold part is in alignment with the aligned platens in the press while in its other position it is supported upon said second guide at one side of the press.

LANCASTER P. CLARK, JR.